United States Patent
Kishida

[19]

[11] Patent Number: 5,906,442
[45] Date of Patent: *May 25, 1999

[54] PRINT CONTROL APPARATUS, PRINT CONTROL METHOD, INFORMATION PROCESSING APPARATUS, INFORMATION PROCESSING METHOD, AND STORAGE MEDIUM STORING CONTROL PROGRAM

[75] Inventor: Akira Kishida, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/665,571

[22] Filed: Jun. 18, 1996

[30]    Foreign Application Priority Data

Jun. 20, 1995 [JP] Japan .................................. 7-153257
Jun. 13, 1996 [JP] Japan .................................. 8-152325

[51] Int. Cl.$^6$ ........................................................ B41J 5/30
[52] U.S. Cl. ................................................ 400/61; 400/76
[58] Field of Search ................................. 400/54, 74, 61, 400/76, 70

[56]    References Cited

U.S. PATENT DOCUMENTS

| | | | |
|---|---|---|---|
| 4,814,892 | 3/1989 | Igarashi | 400/74 |
| 5,218,353 | 6/1993 | Okumura | 400/74 |
| 5,306,102 | 4/1994 | Ota | 400/61 |
| 5,328,278 | 7/1994 | Kokubo | 400/74 |
| 5,332,320 | 7/1994 | Ohara | 400/76 |
| 5,388,920 | 2/1995 | Ohara | 400/76 |

FOREIGN PATENT DOCUMENTS

| | | | |
|---|---|---|---|
| 0521673 | 1/1993 | European Pat. Off. | 400/74 |
| 0575169 | 12/1993 | European Pat. Off. | 400/74 |
| 0588513 | 3/1994 | European Pat. Off. | 400/74 |

*Primary Examiner*—John Hilten
*Attorney, Agent, or Firm*—Fitzpatrick, Cella, Harper & Scinto

[57]    ABSTRACT

A print control apparatus for causing a printer unit to print data input from an information processing apparatus includes an analysis unit and a control unit. The analysis unit analyzes test data on the basis of print setting information. The control unit stores the analysis result obtained by the analysis unit in a memory. A print control method, a storage medium, an information processing apparatus, and an information processing method are also disclosed.

21 Claims, 8 Drawing Sheets

PRINT CONTROL APPARATUS, PRINT CONTROL METHOD, INFORMATION PROCESSING APPARATUS, INFORMATION PROCESSING METHOD, AND STORAGE MEDIUM STORING CONTROL PROGRAM

BACKGROUND OF THE INVENTION

1. Field of the Invention

The present invention relates to a print control apparatus for causing a printer unit to print data input from an information processing apparatus, a print control method, and a storage medium storing control programs used in the print control apparatus.

The present invention also relates to an information processing apparatus for outputting data to a plurality of print control apparatuses via a network, an information processing method, and a storage medium storing control programs used in the information processing apparatus.

2. Related Background Art

As conventional printers, an image printer, a page printer, and the like are known. The image printer receives image data from an external unit such as a host computer and performs a print operation. The page printer receives print data written in a page-description language or the like, and performs a print operation after rasterizing (rendering) the data into a bit image on the basis of the language data.

Print settings in printers of this type vary depending on the features and characteristics of the printers. A user performs setting for each print data as needed.

In a conventional printer, it is difficult for the user to find an optimal setting for a particular document to be printed, and hence it takes time to perform an operation for the setting. When a plurality of printers are set in a network, in particular, the user cannot determine which printer is the optimal one to print a ceratin document.

Such a problem is associated with control done by a host computer, and the performance of each printer cannot be known unless a print operation is actually performed. In addition, when print data are to be distributed and printed, optimal distributed print processing of the print data cannot often be performed.

SUMMARY OF THE INVENTION

The present invention has been made to solve the above problems, and has as its object to automatically set an optimal print environment for print data in a print control apparatus without making the user recognize it.

It is another object of the present invention to automatically select an optimal print control apparatus for print data without making the user recognize it.

In order to achieve the above objects, according to the present invention, there is provided a print control apparatus for causing a printer unit to print data input from an information processing apparatus, comprising analysis means for analyzing test data on the basis of print setting information, and control means for storing an analysis result obtained by the analysis means in a memory.

In order to achieve the above objects, according to the present invention, there is provided a print control method for a print control apparatus for causing a printer unit to print data input from an information processing apparatus, comprising the analysis step of analyzing test data on the basis of print setting information, and the control step of storing an analysis result obtained in the analysis step in a memory.

In order to achieve the above objects, according to the present invention, there is provided a storage medium for storing a control program used in a print control apparatus for causing a printer unit to print data input from an information processing apparatus, comprising an analysis module for an analysis step of analyzing test data on the basis of print setting information, and a control module for a control step of storing an analysis result obtained by the analysis module in a memory.

In order to achieve the above objects, according to the present invention, there is provided an information processing apparatus for outputting data to a plurality of print control apparatuses via a network, comprising obtainment means for obtaining analysis results of test data from the plurality of print control apparatuses, and control means for comparing each of the analysis results obtained by the obtainment means with the data to be output, and selecting one of the plurality of print control apparatuses which is an optimal print control apparatus for printing the data to be output.

In order to achieve the above objects, according to the present invention, there is provided an information processing method for an information processing apparatus for outputting data to a plurality of print control apparatuses via a network, comprising the obtainment step of obtaining analysis results of test data from the plurality of print control apparatuses, and the control step of comparing each of the analysis results obtained in the obtainment step with the data to be output, and selecting one of the plurality of print control apparatuses which is an optimal print control apparatus for printing the data to be output.

In order to achieve the above objects, according to the present invention, there is provided a storage medium storing a control program used in an information processing apparatus for outputting data to a plurality of print control apparatuses via a network, comprising an obtainment module for an obtainment step of obtaining analysis results of test data from the plurality of print control apparatuses, and a control module for a control step of comparing each of the analysis results obtained in the obtainment module with the data to be output, and selecting one of the plurality of print control apparatuses which is an optimal print control apparatus for printing the data to be output.

DETAILED DESCRIPTION OF THE PREFERRED EMBODIMENTS

The preferred embodiments of the present invention will be described in detail below with reference to the accompanying drawings.

First Embodiment

Figure 1:
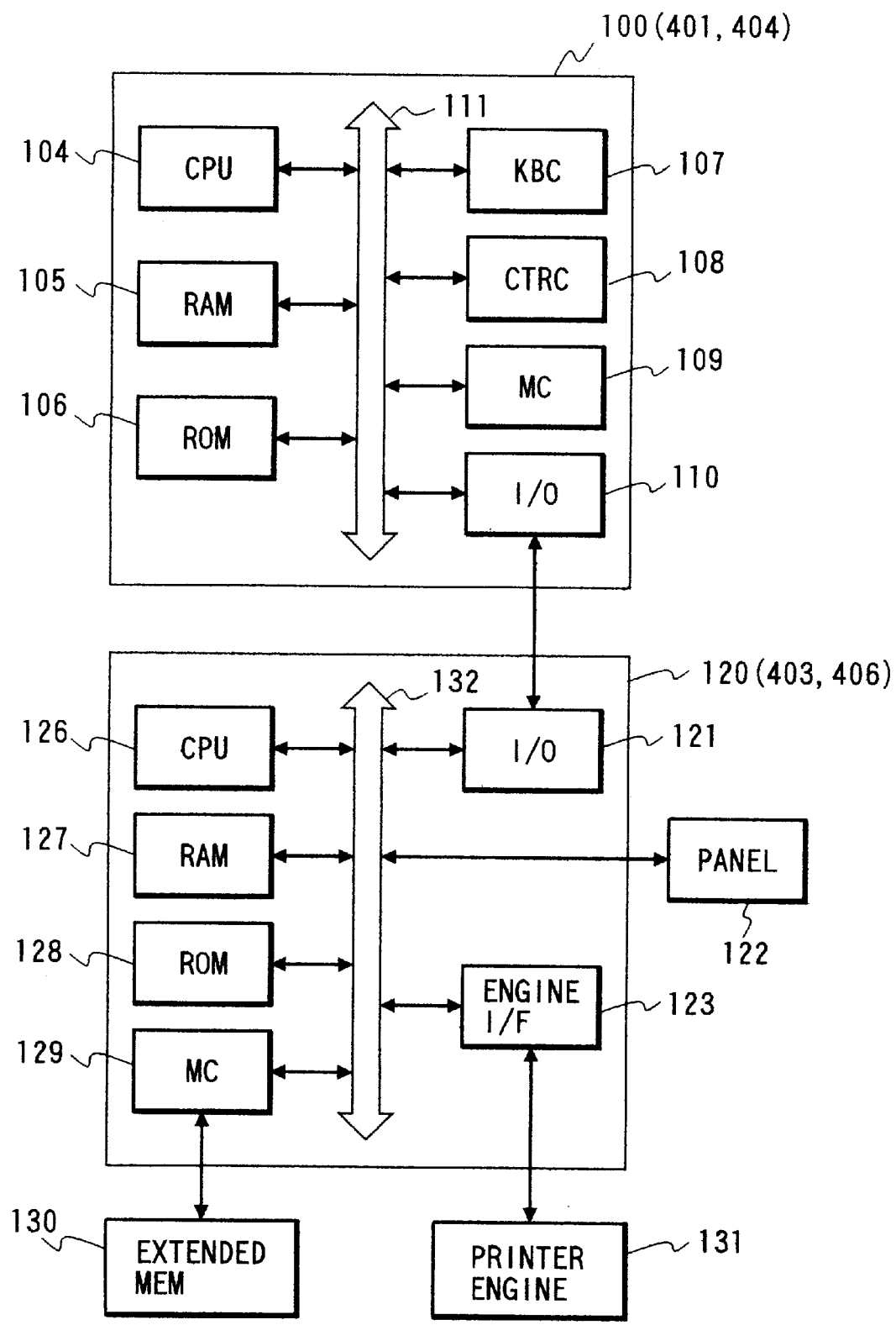
FIG. 1 is a block diagram for explaining the arrangement of a printer system according to the first embodiment of the present invention.

FIG. 1 is a block diagram for explaining the arrangement of a printer system according to the first embodiment of the present invention. The printer system is constituted by a printer 120 (403, 406) and a host computer 100 (401, 404).

Referring to FIG. 1, the host computer 100 (401, 404) supplies print data (PDL) or the like to the printer 120 (403, 406). Bidirectional interface units 110 and 121 control data transfer between the printer 120 and the host computer 100. A CPU 104 controls components connected to a bus 111 on the basis of a data processing program, a print control program (print driver), and the like (shown in the flow charts of FIGS. 5 to 7 (to be described later)) stored in a ROM 106, a RAM 105 and the like.

A keyboard controller 107 processes keyboard input data from a keyboard (not shown). A display controller 108 controls a display operation of a display (not shown). A memory controller 109 controls memory access to a hard disk (HD), an extended RAM, and the like (none of which are shown).

In the printer 120 (403, 406), a CPU 126 performs various control operations in accordance with control programs and data stored in a ROM 128 via a bus 132 and indicated by the flow charts of FIGS. 2 and 3 to be described later, thereby controlling the overall operation of the printer 120 (403, 406). In addition, in the various control operations, the CPU 126 stores data and the like in a RAM 127. A printer unit (printer engine) 131 prints an image on a recording medium by using a laser printer. An operation panel 122 is used to set print setting items and the like.

A memory controller 129 controls access to an extended memory 130 (flash memory or the like). An engine interface 123 transfers image data such as a bit map developed in the RAM 127 to the printer engine 131. Note that the RAM 127 is used as a reception buffer area for storing PDL data or the like received from the host computer 100, an intermediate buffer area for storing intermediate data obtained by converting PDL data, an image buffer area for storing image data obtained by converting intermediate data, and the like.

Figure 2:
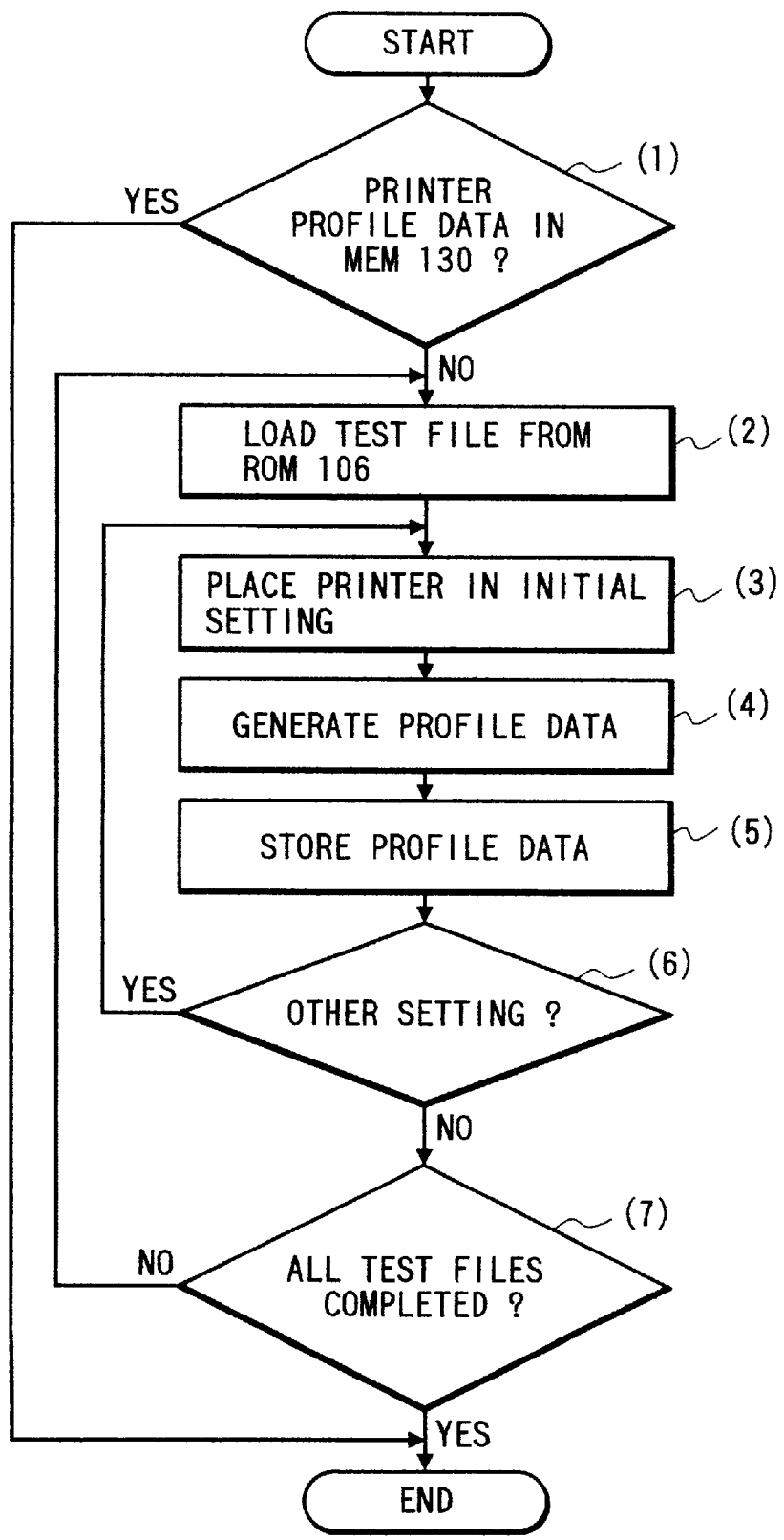
FIG. 2 is a flow chart showing a control program for print processing in the printer in FIG. 1.

FIG. 2 is a flow chart showing a control program in the printer 120 in FIG. 1. This program is stored in the ROM 128 and executed by the CPU 126. Note that "(1)" to "(7)" in FIG. 2 indicate steps.

Assume that when a print environment for determining print processing conditions is set by a user through the operation unit or in accordance with a command from the host computer, the print environment is stored and managed as a set file in the extended memory 130.

The host computer 100 causes the printer 120 to process a test sample without outputting a paper discharge control command. Information such as specification data, print setting items, or performance data (to be described later) is transferred to the host computer 100 via the bidirectional interface units 110 and 121.

When print data is received from the host computer 100 via a printer driver, test processing is started. First of all, it is checked in step (1) whether printer profile data has been stored in the extended memory 130. If YES in step (1), the test is completed.

If NO in step (1), the flow advances to step (2) to load a test file (or test files) from the ROM 106 or the like. In this case, a test file (test data) includes test data consisting of only text data, test data consisting of only image data, and test data consisting of both text data and image data. In addition, a test file includes complicated test data which demands much time for rasterization, and test data which does not demand much time for rasterization.

In step (3), the printer is placed in an initial setting state. In step (4), only analysis of the file loaded in step (2) is executed without outputting the file to the printer engine 131 to generate profile data (to be described later), and the generated profile data is transferred to the host computer 100. In step (5), the profile data is stored in the extended memory 130.

In addition, in step (4), the time required to analyze the test data to rasterize it is obtained by looking up a table in the ROM 128 in which the rasterize time required for each drawing command in the test data is stored.

In step (6), it is checked whether setting other than the initial setting has been performed. If YES in step (6), the processing in steps (3) to (5) is executed for every print setting.

More specifically, profile data for color mode 8-bit setting, profile data for color mode 24-bit setting, profile data for high-quality (600 dpi) mode setting, or profile data for low-quality (300 dpi) mode setting is generated.

If NO in step (6), it is checked in step (7) whether testing of all test files is completed. If NO in step (7), the processing in steps (2) to (6) is performed for all the test files. In this case, it suffices if each test file contains a predetermined unit data amount such as one or a plurality of pages.

In this embodiment, for example, profile data includes the following items.

Profile data includes the type of printed matter data (print data), specification data, print setting items, performance data obtained by the above test processing, and the like.

For example, the specification data includes a bit map data amount "memory size (xxxx bytes−xxx bytes<xxxx bytes<xxxx bytes+xxx bytes), bit map data count (xxx data−xx data<xxx data<xxx data+xx data)" and a character string size "character count (xxx characters−xx characters<xxx characters<xxx characters+xx characters), memory size (xxxx bytes−xxx bytes<xxxx bytes<xxxx bytes+xxx bytes), font type count (xxx types−xx types<xxx types<xxx types+xx types), logic drawing instruction count (xxx instructions−xx instructions<xxx instructions<xxx instructions+xx instructions), file size (xxxx bytes−xxx bytes<xxxx bytes<xxxx bytes+xxx bytes)".

The print setting items include, for example, color mode 8-bit/24-bit setting, font replacement ON/OFF, bit map mode ON/OFF, low-resolution mode ON/OFF, and high-quality mode ON/OFF (dither processing or the like).

Also, the performance data includes, for example, a rasterize (rendering) time, a paper discharge time in the printer engine, and the time required to release the host computer. Note that the paper discharge time is a fixed value in each printer engine, and this data is stored in the ROM 128 in advance.

Figure 3:
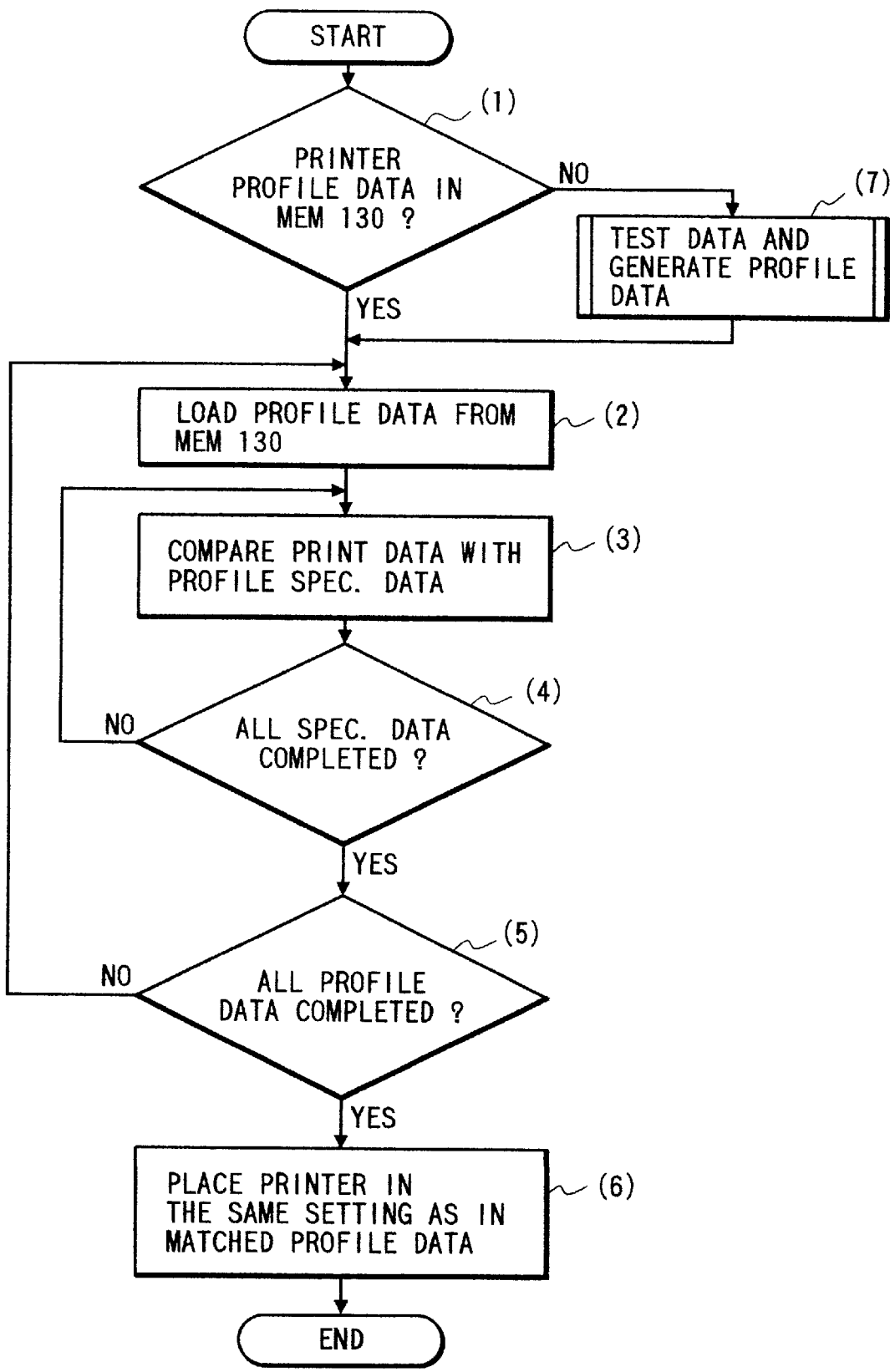
FIG. 3 is a flow chart showing a control program for optimization setting processing in the printer in FIG. 1.

FIG. 3 is a flow chart showing a control program for an optimization setting procedure in the printer 120 in FIG. 1. This program is stored in the ROM 128 and executed under the control of the CPU 126. Note that "(1)" to "(7)" in FIG. 3 indicate steps.

First of all, it is checked in step (1) whether printer profile data is stored in, e.g., the extended memory 130. If NO in step (1), test processing is performed in step (7) on the basis of test data from the host computer 100 in accordance with the procedure shown in FIG. 2 to generate profile data.

If YES in step (1), the profile data is loaded from the extended memory 130 in step (2). In step (3), for example, one-page data of print data received from the host computer is compared with corresponding specification data of the profile data. In step (4), it is checked whether comparison of all specification data is completed. If NO in step (4), the flow returns to step (3). If YES in step (4), it is checked in step (5) whether comparison of all profile data is completed. If NO in step (5), the flow returns to step (2). If YES in step (5), the same print setting items as those in the profile data including the matched specification data are set in the printer in step (6), and the processing is completed. With this processing, optimal print setting items for print data can be automatically set without making the user recognize it.

Second Embodiment

The second embodiment of the present invention will be described next.

Figure 4:
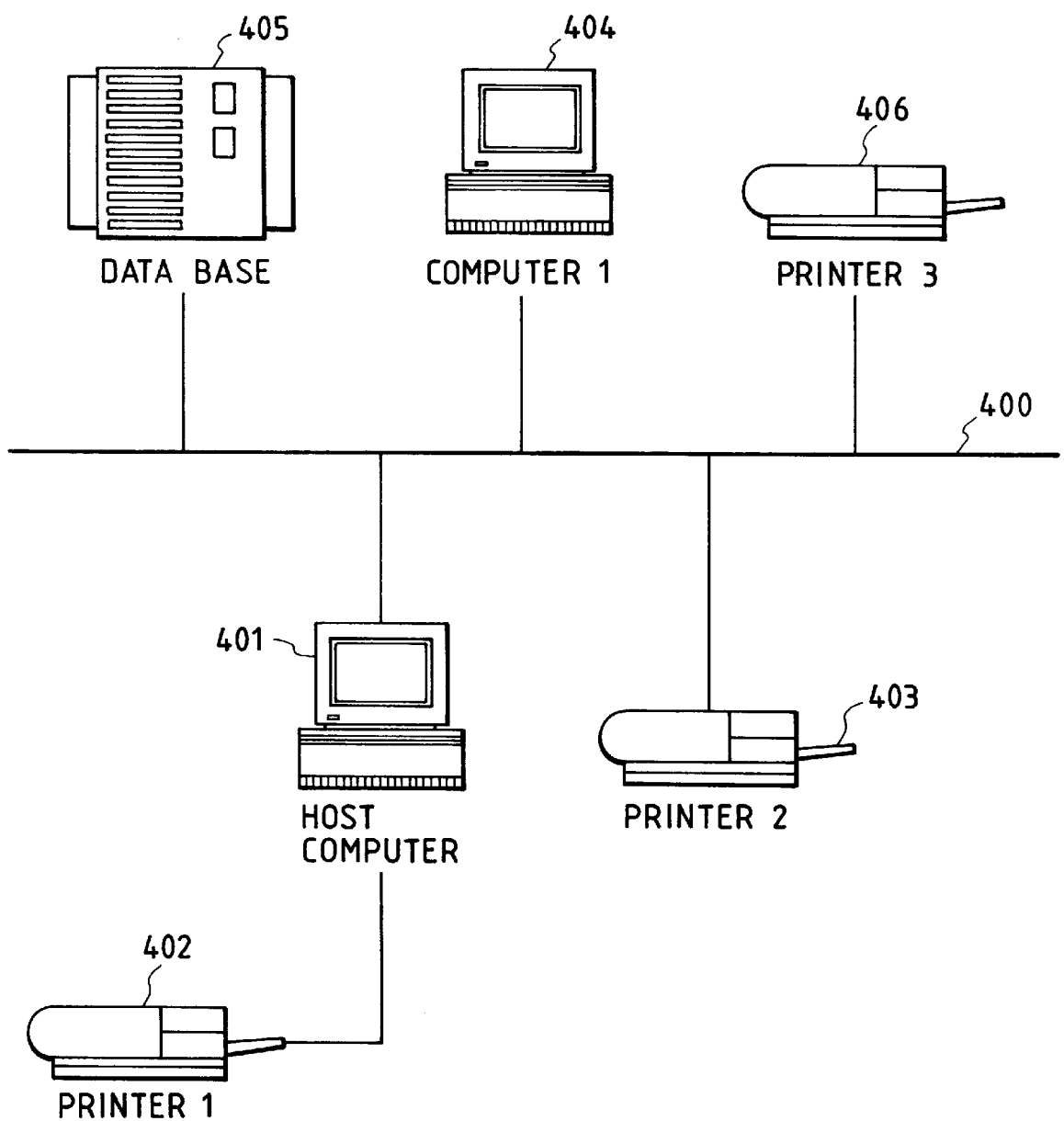
FIG. 4 is a block diagram showing the arrangement of a print system according to the second embodiment of the present invention.

FIG. 4 is a block diagram for explaining the arrangement of a print system according to the second embodiment of the present invention. In this print system, a printer 402 is connected to a host computer 401 in a network 400. The system further includes a computer 404 connected to a plurality of network printers, e.g., printers 403 and 406, via the network 400, a database 405, and the like.

The correspondence between the means of this embodiment and the means of the second and third aspects of the present invention and their functions will be described below with reference to, e.g., FIGS. 4 and 1. Note that each of the printers 402, 403, and 406 has the same communication function as that of the printer 120 in FIG. 1, and each of the host computers 401 and 404 has the same communication function as that of the host computer 100 in FIG. 1.

Figure 5:
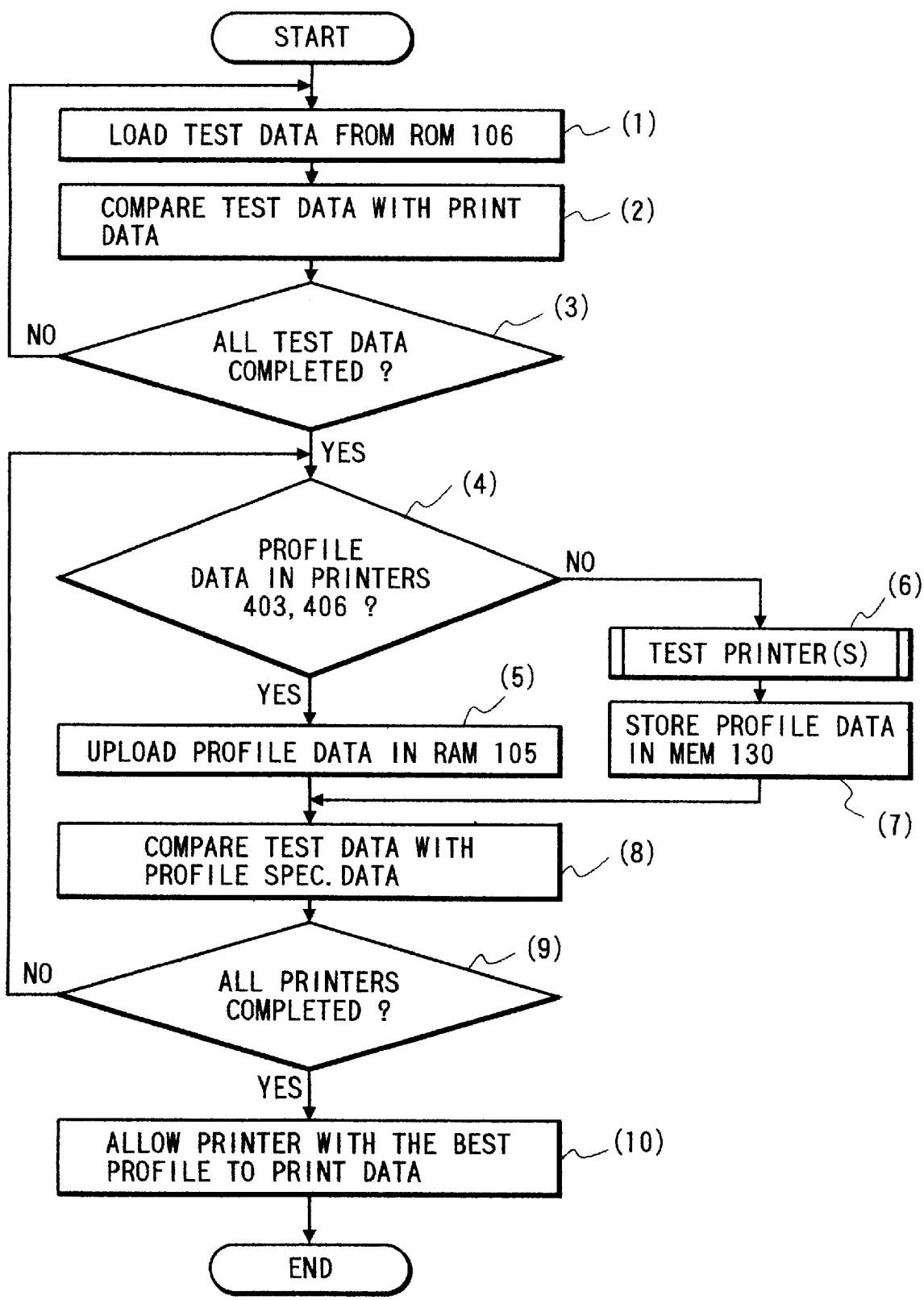
FIG. 5 is a flow chart showing a control program for printer switching processing in a host computer in FIG. 4.

FIG. 5 is a flow chart showing a control program for printer switching processing in the print system in FIG. 4. The control program for executing this processing is executed under the control of a CPU (the CPU 104 in FIG. 1) in the host computer 401. Note that "(1)" to "(7)" in FIG. 5 indicate steps. For example, this control program is stored in the ROM 106 in FIG. 1 in advance.

Information for each printer is ensured while the load on the host computer is small.

In step (2), print data is compared with the test data loaded from the ROM 106 in step (1) to extract test data similar to the print data, thereby performing classification.

In step (3), it is checked whether all test data are completed. If NO in step (3), the flow returns to step (1). If YES in step (3), the host computer 401 checks in step (4) whether profile data as the test result obtained in the first embodiment is stored in all the printers 403 and 406 in the network 400. If it is determined that there is a printer in which profile data is not stored, test processing similar to the one in the first embodiment is performed in step (6). In step (7), the profile data is retained in the extended memory 130 and stored in the RAM 105. The flow then advances to step (8) and the subsequent steps.

If it is determined in step (4) that the profile data is stored in the printers, the profile data is up-loaded into the RAM 105 in step (5). In step (8), the specification data of each of the profile data obtained in steps (5) and (7) is compared with the test data obtained in step (2). In step (9), it is checked whether checking of the profile data for all the printers is completed. If NO in step (9), the flow returns to step (4). If YES in step (9), a printer having the best performance data among profile data having specification data matching the test data obtained in step (2) is selected, and a print operation is executed in step (10).

Third Embodiment

The third embodiment of the present invention will be described next. The third embodiment has the same arrangement as that of the second embodiment in FIG. 4.

Figure 6:
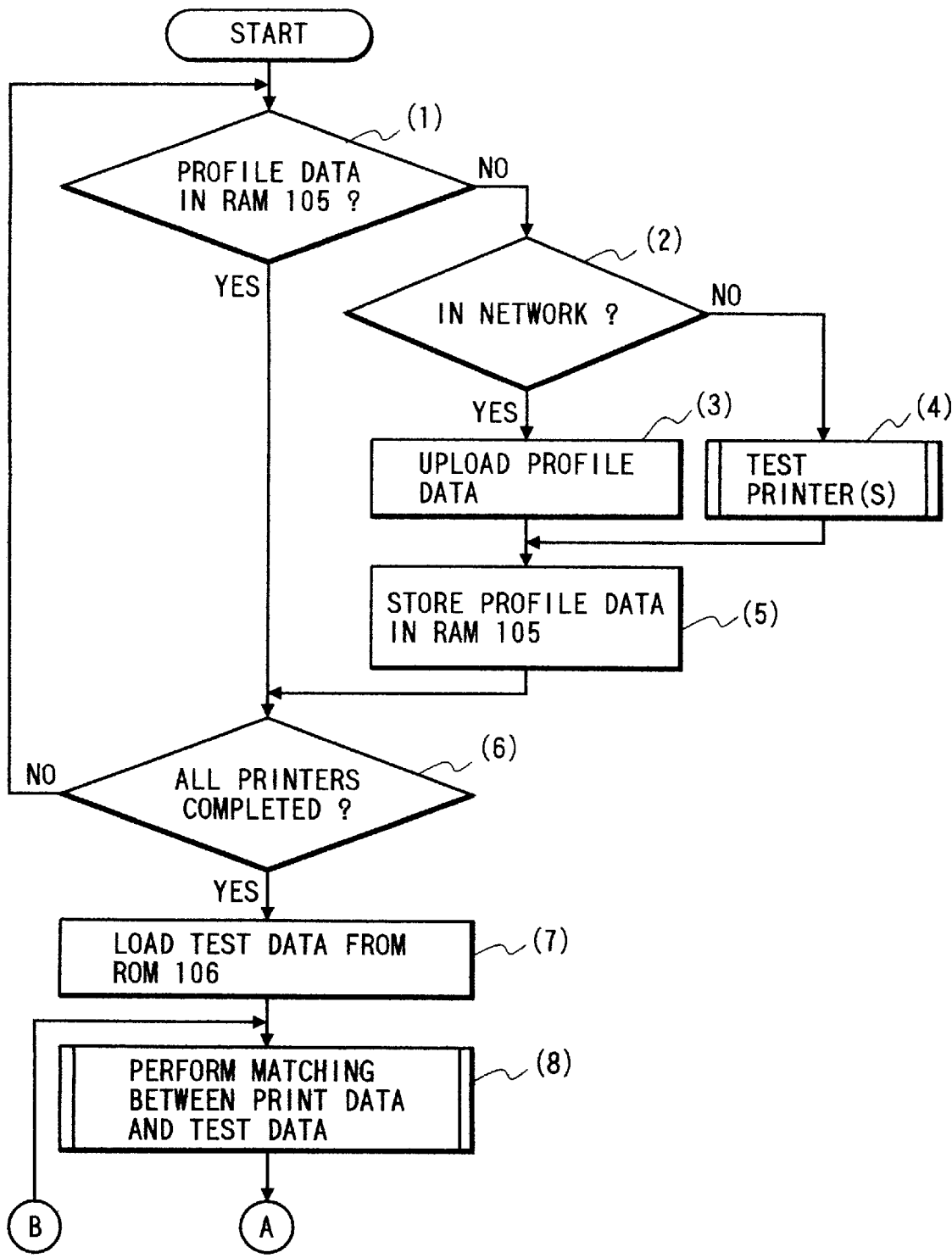
FIG. 6 is a flow chart showing a control program for printer selection processing in the host computer connected to a network in FIG. 4.
Figure 7:
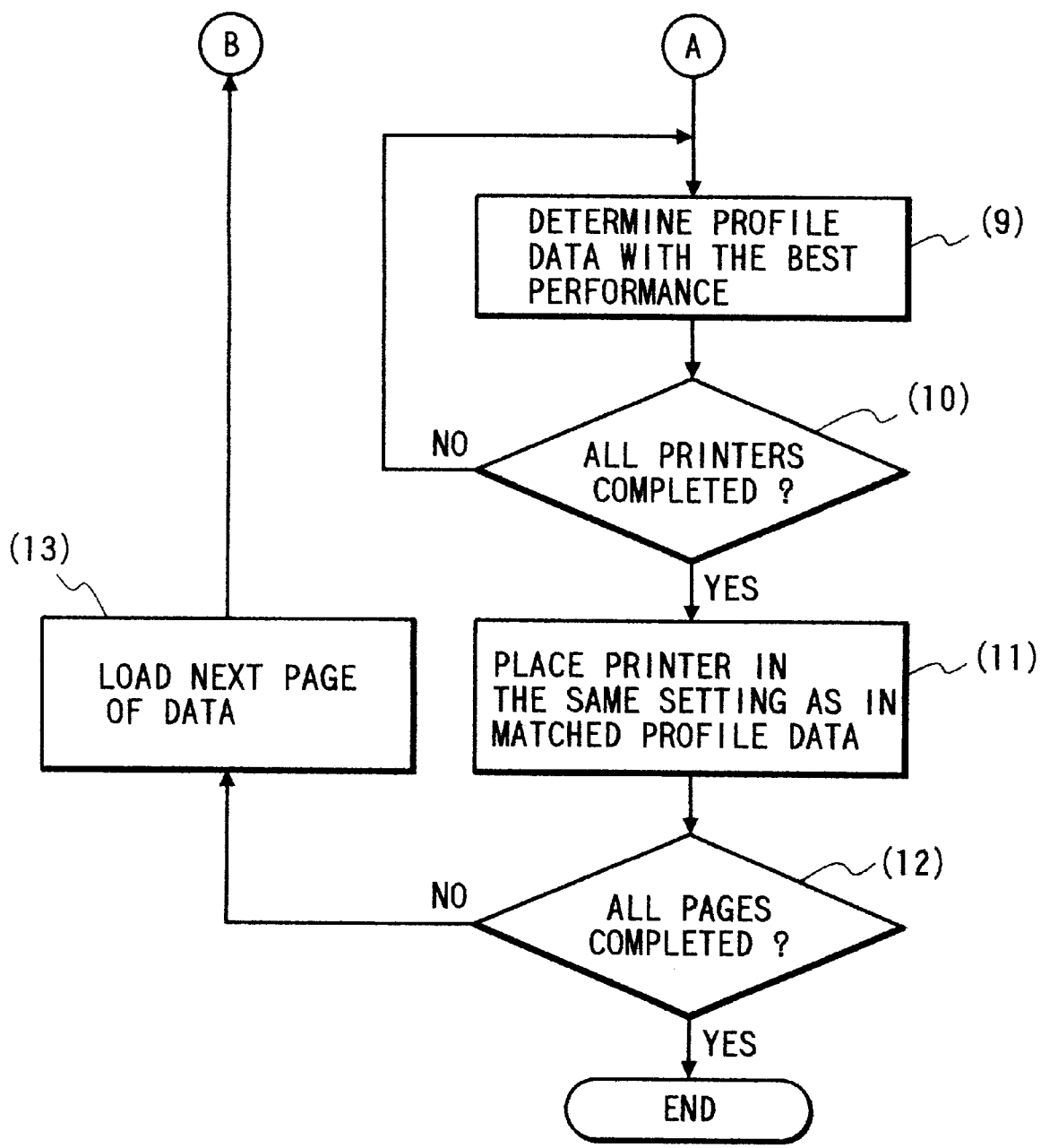
FIG. 7 is a flow chart showing a control program for printer selection processing in the host computer connected to the network in FIG. 4.

FIGS. 6 and 7 are flow charts showing a control program for printer selection processing performed by a computer 404 connected to the network shown in FIG. 4. This control program is stored in, e.g., a ROM 106 and is executed by a CPU 104. Note that "(1)" to "(13)" in FIGS. 6 and 7 indicate steps.

First of all, it is checked in step (1) whether the profile data for each printer, which has been analyzed by the test processing in the first embodiment of the present invention, is stored in a RAM 105 of the computer 404. If NO in step (1), all the printers in the network are searched to check whether the profile data for all the printers are stored in the computer 404 in step (2). If YES in step (2), the profile data are up-loaded via the network in step (3). In step (5), the obtained profile data are stored in the internal memory (e.g., the RAM 105) of the computer 404.

If it is determined step (2) that no profile data is present in the network, test processing is performed in the same manner as in the first embodiment in step (4) to generate profile data and store it in an extended memory 130. In addition, the profile data is up-loaded and stored in the internal memory (e.g., the RAM 105) of the computer 404 in step (5).

It is then checked in step (6) whether the same processing has been performed for all the printers. If NO in step (6), the flow returns to step (1) to perform the processing in steps (1) to (5) for all the printers, thereby preparing profile data for all the printers in the network.

In step (7), test data is loaded from the ROM 106. In step (8), matching between print data corresponding to the first page and the test data is performed to select test data which is most similar to the print data. In step (9), profile data having specification data matching the test data selected in step (8) are selected, and one of the selected profile data which has the best performance data is determined, thereby selecting a printer having the determined profile data.

In step (10), it is checked whether collation for all the printers is completed. If NO in step (10), the flow returns to step (9). If YES in step (10), print setting items for the profile data are set in the selected printer for the page. In step (12), it is checked whether collation is completed for each page of print data. If NO in step (12), the flow advances to step (13) to load the data of the next page. The processing in steps (8) to (12) is then repeated. If YES in step (12), the processing is completed.

With this processing, an optimal printer for the print data of each page is selected, and optimal print setting items can be automatically set in each printer. Therefore, print data can be distributed and processed by optimal printers in units of pages.

Figure 8:
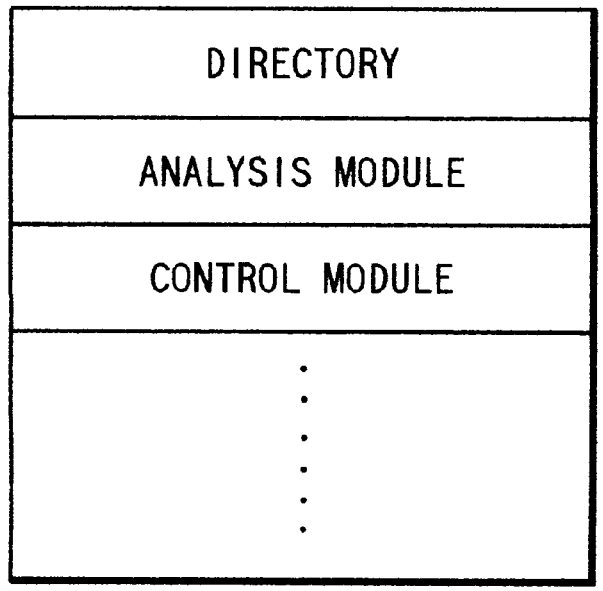
FIG. 8 is a view showing an example of the memory map of a storage medium used in the printer.

A storage medium like the ROM 128 used in the print control apparatus of this embodiment will be described next with reference to the memory map in FIG. 8.

A storage medium is used to store control programs for analyzing test data on the basis of print setting information, and storing the analysis result in a memory. As shown in FIG. 8, it suffices if such a storage medium stores at least the program codes of an "analysis module" and a "control module".

In this case, the "analysis module" indicates a program code for analyzing test data on the basis of print setting information. The "control module" indicates a program code for storing the analysis result obtained by the analysis module in the memory.

Figure 9:
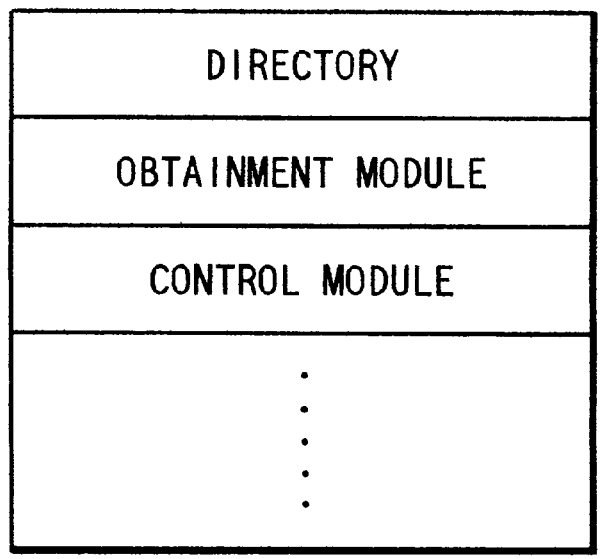
FIG. 9 is a view showing an example of the memory map of a storage medium used in the host computer.

A storage medium such as the ROM 106 used in the information processing apparatus of this embodiment will be described next with reference to the memory map of FIG. 9.

A storage medium is used to store control programs for obtaining analysis results of test data from a plurality of print control apparatuses, comparing each analysis result with data to be output, and selecting one of the print control apparatuses which is the optimal apparatus for printing the data to be output. As shown in FIG. 9, it suffices if such a storage medium stores at least the program codes of an "obtainment module" and a "control module".

In this case, the "obtainment module" is a program code for obtaining test data analysis results from a plurality of print control apparatuses via the network. The "control module" is a program code for comparing each analysis result obtained by the obtainment module with the data to be output, and selecting one of a plurality of print control apparatuses which is the optimal apparatus for printing the data to be output.

As storage media, in addition to the ROM 128 and the ROM 106 in this embodiment, a floppy disk, an optical disk, a magnetooptic disk, a CD-ROM, a CD-R, a magnetic tape, a nonvolatile memory card, and the like which are detachably loaded in a print control apparatus and an information processing apparatus can be used.

What is claimed is:

1. A print control apparatus for causing a printer unit to print data input from an information processing apparatus, comprising:
   drawing means for executing a drawing process of test data in a first memory on the basis of print setting information to produce a drawing result, the test data including no paper discharge command;
   control means for controlling a second memory to store profile data generated based on the drawing result produced by said drawing means, the profile data including the print setting information; and
   output means for outputting the profile data stored in the second memory to the information processing apparatus.

2. An apparatus according to claim 1, wherein the profile data includes a rasterize time obtained by analyzing the data.

3. An apparatus according to claim 1, wherein the profile data includes performance data obtained by analyzing the test data.

4. An apparatus according to claim 3, wherein the performance data includes a logic drawing instruction count in the test data.

5. An apparatus according to claim 1, wherein said drawing means executes a drawing process of the test data for each print setting information.

6. An apparatus according to claim 1, wherein the print setting information comprises information for setting a quality.

7. An apparatus according to claim 1, wherein said control means controls the second memory to store the profile data and the print setting information.

8. An apparatus according to claim 1, wherein said control means compares the profile data with data input from the information processing apparatus, and sets print setting information for the matched profile data in said print control apparatus.

9. An apparatus according to claim 1, further comprising:
   memory means for storing a plurality of the test data; and
   selection means for selecting one of the plurality of text data stored in said memory means corresponding to a print sample received from the information processing apparatus.

10. A print control method for a print control apparatus for causing a printer unit to print data input from an information processing apparatus, comprising:
    executing a drawing process of test data in a first memory on the basis of print setting information to produce a drawing result, the test data including no paper discharge command;
    controlling a second memory to store profile data generated based on the drawing result produced by said executing step, the profile data including the print setting information; and
    outputting the profile data stored in the second memory to the information processing apparatus.

11. A storage medium for storing a control program used in a print control apparatus for causing a printer unit to print data input from an information processing apparatus, comprising:
    an analysis module for executing a drawing process of test data in a first memory on the basis of print setting information to produce a drawing result, the test data including no paper discharge command;
    a control module for controlling a second memory to store profile data generated based on the drawing result produced by said analysis module, the profile data including the print setting information; and
    an output module for outputting the profile data stored in the second memory to the information processing apparatus.

12. An information processing apparatus for outputting data to a plurality of print control apparatuses via a network, comprising:
    obtainment means for obtaining, from each of the plurality of print control apparatuses, profile data generated by executing a drawing process of test data in a memory of the print control apparatus, the test data including no paper discharge command and the profile data including print setting information; and
    control means for comparing each of the profile data obtained by said obtainment means with the data to be output, and selecting one of the plurality of print control apparatuses as an optimal print control apparatus for printing the data to be output in response to the comparison.

13. An apparatus according to claim 12, wherein each of the profile data includes a rasterize time obtained by analyzing the test data in a corresponding one of the plurality of print control apparatuses.

14. An apparatus according to claim 12 wherein each of the profile data includes performance data obtained by analyzing the test data.

15. An apparatus according to claim 14, wherein the performance data includes a logic drawing instruction count in the test data.

16. An apparatus according to claim 12, wherein each of the plurality of print control apparatuses analyzes the test data for each print setting information to be set.

17. An apparatus according to claim 12, wherein said control means compares each of the profile data obtained by said obtainment means with the data to be output in units of pages, and selects one of the plurality of print control apparatuses which is an optimal print control apparatus for printing the data to be output.

18. An apparatus according to claim 12, wherein said control means sets a print environment for the selected print control apparatus on the basis of the print setting information included in the performance data.

19. An apparatus according to claim 12, wherein said control means compares the test data with the data to be output, further compares matched test data with each of the profile data obtained by said obtainment means, and selects one of the plurality of print control apparatuses which is an optimal print control apparatus for printing the data to be output.

20. An information processing method for an information processing apparatus for outputting data to a plurality of print control apparatuses via a network, comprising:

obtaining, from each of the plurality of print control apparatuses, profile data generated by executing a drawing process of test data in a memory of the print control apparatus, the test data including no paper discharge command and the profile data including print setting information; and comparing each of the profile data obtained in said obtaining step with the data to be output, and selecting one of the plurality of print control apparatuses as an optimal print control apparatus for printing the data to be output in response to the comparison.

21. A storage medium storing a control program used in an information processing apparatus for outputting data to a plurality of print control apparatuses via a network, comprising:

an obtainment module for obtaining, from each of the plurality of print control apparatuses, profile data generated by executing a drawing process of test data in a memory of the print control apparatus, the test data including no paper discharge command and the profile data including print setting information; and a control module for comparing each of the profile data obtained in said obtainment module with the data to be output, and selecting one of the plurality of print control apparatuses as an optimal print control apparatus for printing the data to be output in response to the comparison.

* * * * *

UNITED STATES PATENT AND TRADEMARK OFFICE
CERTIFICATE OF CORRECTION

PATENT NO.   :  5,906,442
DATED        :  May 25, 1999
INVENTOR(S)  :  AKIRA KISHIDA

It is certified that error appears in the above-identified patent and that said Letters Patent is hereby corrected as shown below:

COLUMN 1

Line 36, "ceratin" should read --certain--.

COLUMN 6

Line 30, "determined" should read --determined in--.

COLUMN 8

Line 59, "claim 12" should read --claim 12,--.

Signed and Sealed this

Twenty-ninth Day of May, 2001

Attest:

NICHOLAS P. GODICI

*Attesting Officer*       *Acting Director of the United States Patent and Trademark Office*